United States Patent
Adilman et al.

(10) Patent No.: US 9,175,801 B2
(45) Date of Patent: Nov. 3, 2015

(54) WHEEL APPARATUS

(71) Applicant: Marketing Displays, Inc., Farmington Hills, MI (US)

(72) Inventors: Alan Adilman, West Bloomfield, MI (US); Gregory James Kenyon, Farmington Hills, MI (US); Michael John Hurley, Berkley, MI (US)

(73) Assignee: Marketing Displays, Inc., Farmington Hills, MI (US)

( * ) Notice: Subject to any disclaimer, the term of this patent is extended or adjusted under 35 U.S.C. 154(b) by 0 days.

(21) Appl. No.: 14/512,834

(22) Filed: Oct. 13, 2014

(65) Prior Publication Data

US 2015/0101223 A1  Apr. 16, 2015

Related U.S. Application Data

(60) Provisional application No. 61/889,680, filed on Oct. 11, 2013.

(51) Int. Cl.
| | |
|---|---|
| *F16M 11/40* | (2006.01) |
| *F16M 11/42* | (2006.01) |
| *G09F 7/22* | (2006.01) |
| *B60B 33/00* | (2006.01) |

(52) U.S. Cl.
CPC ............... *F16M 11/42* (2013.01); *B60B 33/00* (2013.01); *G09F 7/22* (2013.01)

(58) Field of Classification Search
CPC .... F16M 11/42; G07F 15/0056; E01F 9/0124
See application file for complete search history.

(56) References Cited

U.S. PATENT DOCUMENTS

| | | | |
|---|---|---|---|
| 1,505,046 A | 8/1924 | Lush |
| 1,598,438 A | 8/1926 | Hallowell |
| 1,887,894 A | 11/1932 | Schwab |
| 1,918,933 A | 7/1933 | Rogers |
| 2,454,648 A | 11/1948 | Green |
| 2,863,238 A | 12/1958 | Keech |
| 3,347,575 A | 10/1967 | Morris |
| 3,646,696 A | 3/1972 | Sarkisian |
| 3,662,482 A | 5/1972 | Sarkisian |
| 4,288,053 A | 9/1981 | Sarkisian |

(Continued)

FOREIGN PATENT DOCUMENTS

| | | |
|---|---|---|
| EP | 141564 A2 | 5/1985 |
| EP | 818594 A1 | 1/1998 |
| EP | 1120771 A1 | 8/2001 |

*Primary Examiner* — Gary Hoge
(74) *Attorney, Agent, or Firm* — Harness, Dickey & Pierce, P.L.C.

(57) ABSTRACT

A mobile support structure for a display device includes a cross bar having a first end and a second end, a display, a first pair of legs, and a second pair of legs. A first coupling defines a first transverse cavity receiving the cross bar and a first pair of axial cavities receiving the first pair of legs. A second coupling defines a second transverse cavity receiving the cross bar and a second pair of axial cavities receiving the second pair of legs. A locking mechanism is disposed in at least one of the cross bar and the first pair of legs. A wheel coupling includes a wheel and is engaged with at least one of the first coupling and the second coupling such that when in a moving position, the wheel contacts a ground surface and rolls the display from a first location to a second location.

20 Claims, 14 Drawing Sheets

(56) References Cited

U.S. PATENT DOCUMENTS

| | | | |
|---|---|---|---|
| 4,548,379 A | 10/1985 | Seely et al. | |
| 4,593,879 A | 6/1986 | Seely et al. | |
| RE32,359 E | 2/1987 | Seely | |
| 4,691,892 A | 9/1987 | Grewe et al. | |
| 5,220,740 A * | 6/1993 | Brault | E01F 9/0126 248/910 |
| D344,292 S | 2/1994 | Dinan et al. | |
| 5,340,068 A | 8/1994 | Sarkisian et al. | |
| 5,429,417 A | 7/1995 | Kim | |
| 5,437,425 A | 8/1995 | Hou | |
| 5,442,871 A | 8/1995 | Sarkisian et al. | |
| 5,457,849 A * | 10/1995 | Branson | B60B 33/04 16/19 |
| D392,686 S | 3/1998 | Sarkisian et al. | |
| 5,860,386 A | 1/1999 | Schwab et al. | |
| 5,875,518 A | 3/1999 | Walker | |
| 5,875,578 A | 3/1999 | Grewe | |
| 5,878,518 A * | 3/1999 | Grewe | E01F 9/0124 248/910 |
| 5,964,052 A | 10/1999 | Jepsen et al. | |
| 6,776,734 B2 | 8/2004 | van Nimwegen | |
| 7,107,714 B2 * | 9/2006 | Evans | G09F 7/22 40/606.01 |
| 7,140,581 B1 * | 11/2006 | White | E01F 9/0124 248/129 |
| 7,243,450 B2 | 7/2007 | Dicke et al. | |
| 7,404,267 B2 | 7/2008 | Evans et al. | |
| 7,584,563 B2 | 9/2009 | Hillstrom et al. | |
| 7,941,951 B2 | 5/2011 | Hillstrom et al. | |
| 8,104,205 B2 | 1/2012 | Hillstrom et al. | |
| 8,887,423 B1 * | 11/2014 | Morgan | E01F 9/0124 116/63 P |
| 2012/0066947 A1 * | 3/2012 | Glass, Jr. | B60B 37/00 40/606.02 |
| 2012/0279102 A1 * | 11/2012 | Topcuoglu | G09F 7/22 40/606.01 |

* cited by examiner

US 9,175,801 B2

WHEEL APPARATUS

CROSS-REFERENCE TO RELATED APPLICATIONS

This application claims the benefit of U.S. Provisional Application No. 61/889,680, filed on Oct. 11, 2013. The entire disclosure of the above application is incorporated herein by reference.

FIELD

The present disclosure relates to wheels for portable display signs and, more particularly, to wheels for portable display signs that may be assembled and removed without requiring tools.

BACKGROUND

This section provides background information related to the present disclosure which is not necessarily prior art.

Portable display devices have become widespread in the advertising industry. They are often used out of doors and, therefore, must be freestanding. Conventional freestanding display devices include a support structure and a frame for containing a display card. The support structure often includes a cross bar and a set of legs affixed thereto. The cross bar supports the frame in a vertical manner. The legs are fixed to the cross bar with threaded fasteners or other type of fixation means. The convention freestanding displays are often heavy and require equipment to move. Generally tools are also required for assembly and disassembly. Therefore, changing the location of the portable sign can be difficult, expensive and overly time consuming.

SUMMARY

This section provides a general summary of the disclosure, and is not a comprehensive disclosure of its full scope or all of its features.

A mobile support structure for a display device includes a cross bar having a first end and a second end. A display is mounted on the cross bar. A first pair of legs supports the display. A first coupling defines a first transverse cavity and a first pair of axial cavities. The first transverse cavity receives the first end of the cross bar, and each of the first pair of axial cavities receive an end of one of the first pair of legs. A second pair of legs may also support the display. A second coupling defines a second transverse cavity and a second pair of axial cavities. The second transverse cavity receives the second end of the cross bar, and each of the second pair of axial cavities receives an end of one of the second pair of legs. A locking mechanism may be disposed in at least one of the cross bar and the first pair of legs. A wheel coupling includes a wheel and is engaged with at least one of the first coupling and the second coupling such that when in a stationary position, the wheel does not contact a ground surface and when in a moving position, the wheel contacts the ground surface and facilitates rolling the display from a first location to a second location. The display is tilted on the wheel to transition from the stationary position to the moving position.

Another mobile support structure for a display device includes a cross bar that extends between a plurality of couplings. A plurality of legs support the cross bar and the plurality of couplings. A first coupling of the plurality of couplings is engaged with a first end of the cross bar and an end of each of a first pair of the plurality of legs. A second coupling of the plurality of couplings is engaged with a second end of the cross bar and an end of each of a second pair of the plurality of legs. A wheel coupling further includes a wheel and is engaged with at least one of the first coupling and the second coupling. When in a display position, the support structure is supported by the plurality of legs and when in a transport position, the wheel engages the ground surface, the plurality of legs no longer supports the support structure, and the wheel is configured to roll the display from a first location to a second location.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
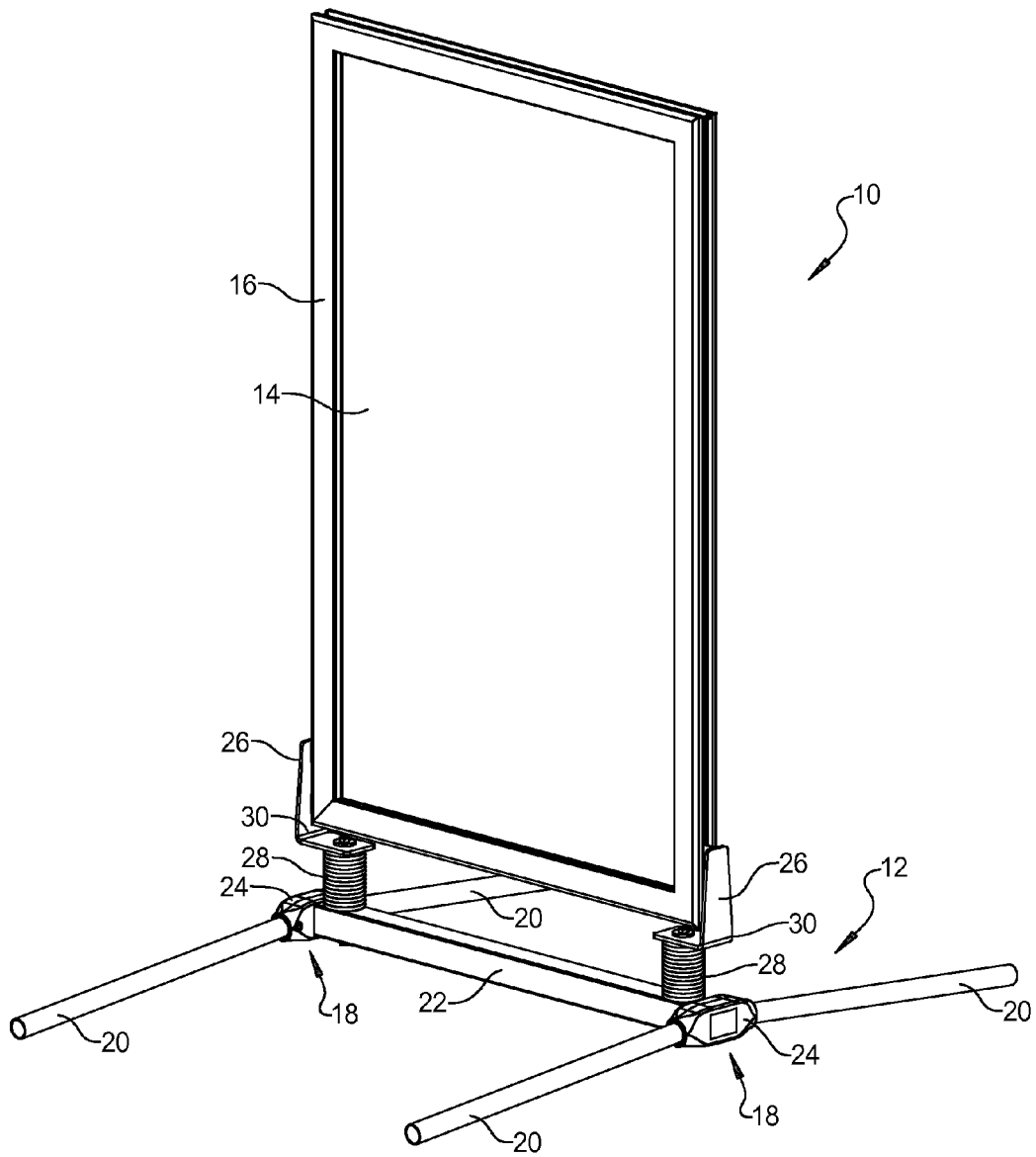
FIG. 1 is a perspective view of a display device in accordance with the present disclosure.

Example embodiments will now be described more fully with reference to the accompanying drawings.

With reference to FIGS. 1-5, a display device 10 is provided including a support structure 12 and a display card 14 in a frame 16. The support structure 12 generally includes two pair of leg assemblies 18. Each leg assembly 18 includes a pair of tubular leg members 20 releasably connected to a coupling 24 supporting a cross bar 22 horizontally. The leg members 20 are illustrated as cylindrical tubes; however, square or rectangular tubing may be included in other embodiments.

The cross bar 22 is also releasably connected to the coupling 24 and supports two frame brackets 26, each including a spring member 28 and an L-shaped member 30. In an example embodiment, the cross bar 22 may be square or rectangular tubing extending between the couplings 24 of the display device 10. In other embodiments, the cross bar 22 may be circular (or any other known shape) tubing or a combination of a solid bar and tubing. The length of the cross bar 22 may be determined based on the width of a particular display device 10, or, in other embodiments, the couplings 24 may be formed to fit any length of cross bar 22 regardless of the width of the display device, as discussed briefly below.

The frame brackets 26 are adapted to cradle the frame 16, which contains the display card 14. A manufacturer uses fasteners (not shown) to secure the frame 16 to each L-shaped member 30, thereby maintaining the frame 16 in a vertical position. The spring members 28 of the frame brackets 26 enable the frame 16 and display card 14 to respond to forces of wind independently of the support structure 12. The display device 10 may generally be the display device described in U.S. Pat. No. 7,404,267 which is incorporated herein by reference in its entirety.

Figure 2:
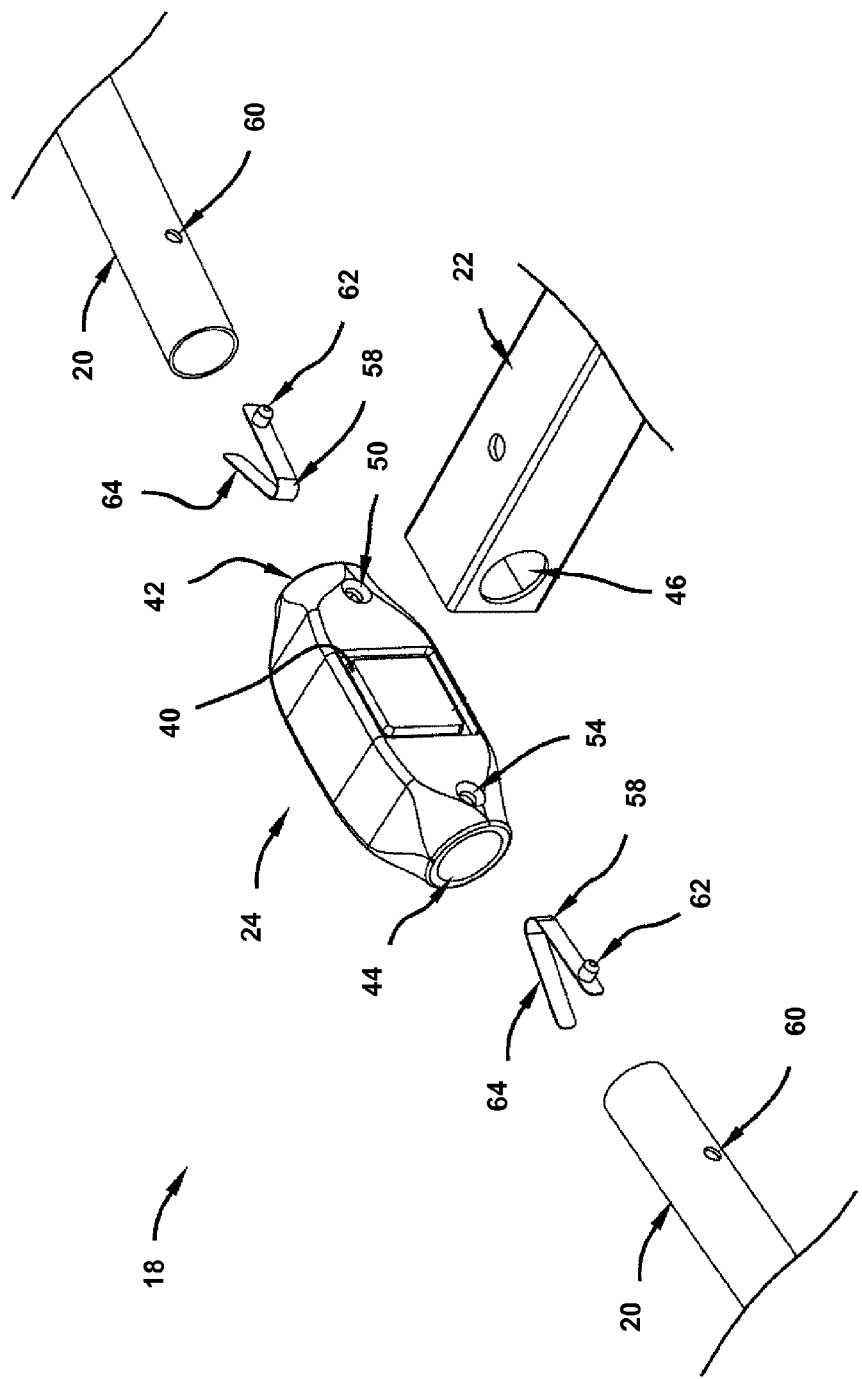
FIG. 2 is a detailed, exploded view of a coupling and legs of the display device of FIG. 1.
Figure 3:
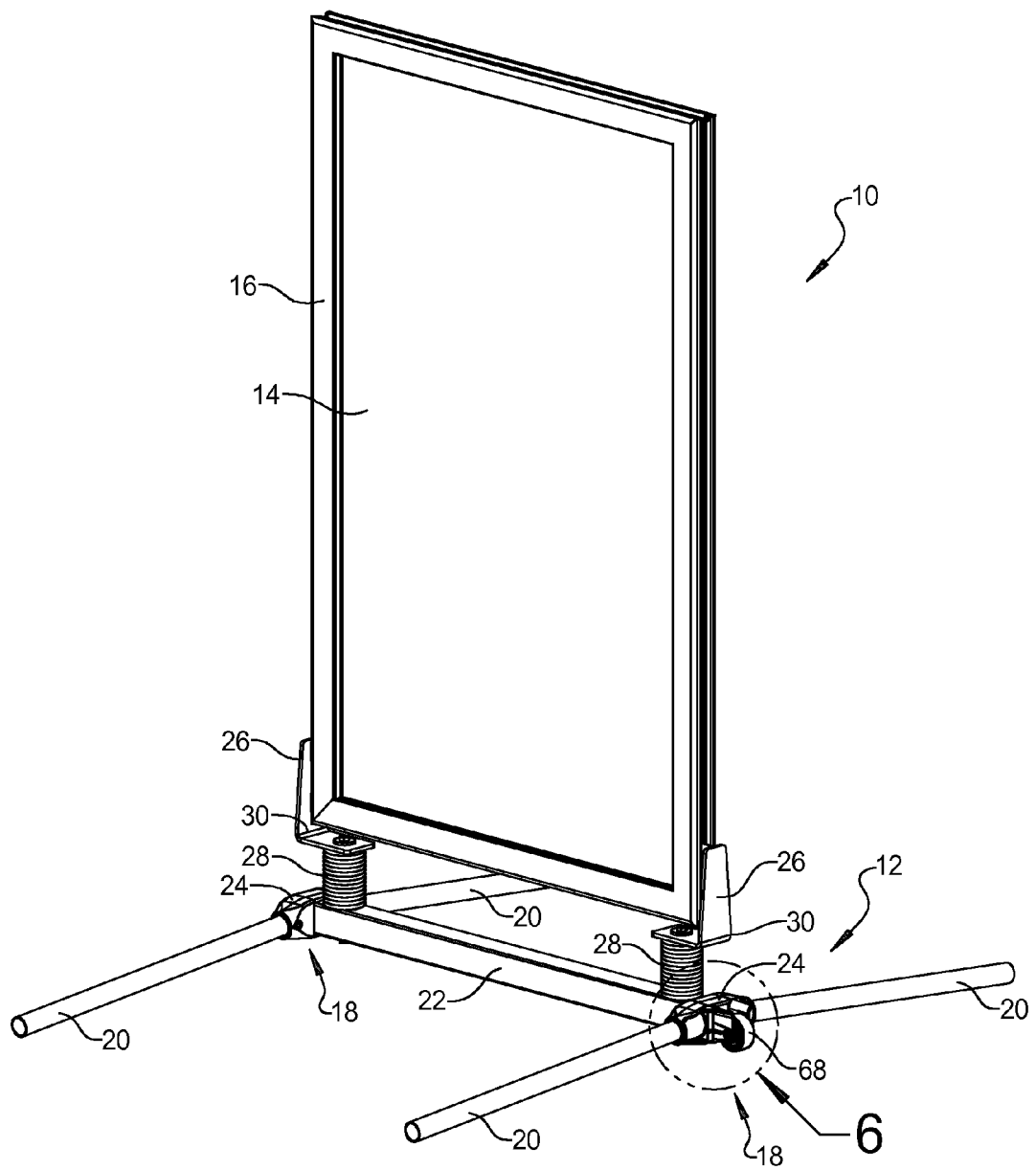
FIG. 3 is a perspective view of a display device with a wheel apparatus in accordance with the present disclosure.
Figure 4:
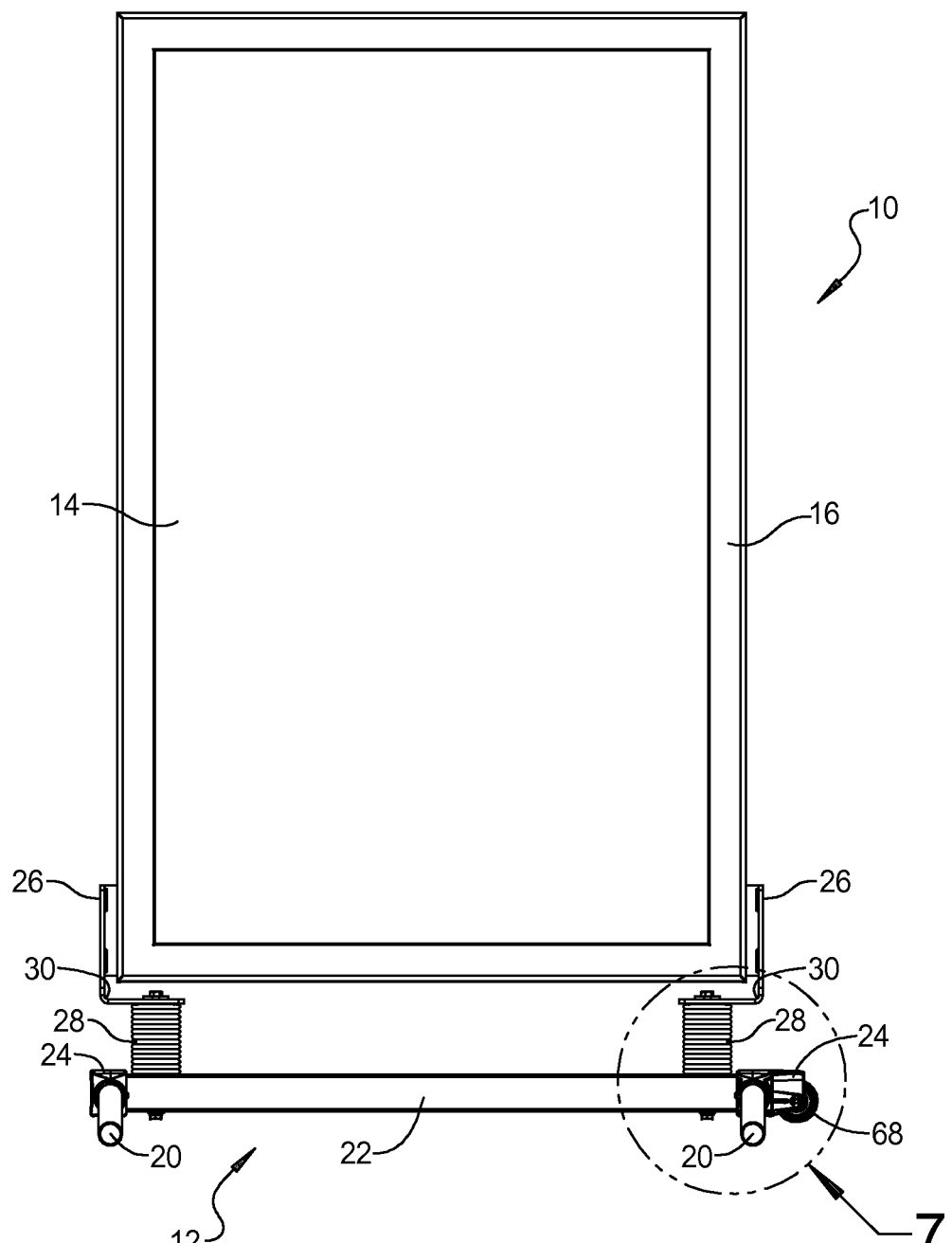
FIG. 4 is a side view of the display device of FIG. 3 in the assembled, stationary position.

Now referring specifically to FIG. 2, leg assembly 18 includes the pair of leg members 20 and the cross bar 22 interconnected by coupling 24. The coupling 24 generally includes a transverse cavity 40 for receiving an end of the cross bar 22. The dimensions of the transverse cavity 40 may be slightly larger than the dimensions of the cross bar 22 such that the cross bar 22 nests within the transverse cavity 40. The transverse cavity 40 may only extend through one side of the coupling 24 such that the cross bar 22 slides within the coupling 24 and abuts the opposite, solid side of the coupling 24. While the cross bar 22 only extends within the transverse cavity 40 on a single side of the coupling 24 in the described embodiment, other embodiments may include a transverse cavity 40 extending through both sides of the coupling 24 such that the cross bar 22 may extend through both sides of the coupling 24 for adjustment purposes and to accommodate frames 16 and display cards 14 of varying widths.

The coupling 24 further includes a pair of opposed axial cavities 42, 44 for receiving leg members 20. More specifically, axial cavities 42, 44 are disposed at a slight downward angle of approximately 10° off horizontal. Furthermore, the cross bar 22 includes a set of apertures 46 (a total of four, two on each end, only one of which can be seen in FIG. 2) for receiving leg members 20. The axial cavities 42, 44 and apertures 46 may have a diameter slightly larger than the outer diameter of the leg members 20 such that the leg members 20 are slideably received within the axial cavities 42, 44 and apertures 46.

Apertures 46 are in alignment with axial cavities 42, 44, when cross bar 22 is inserted into transverse cavity 40. Leg members 20 are received in apertures 46 when inserted into axial cavities 42, 44 of coupling 24. In this manner, leg members 20 interlock with cross bar 22 and cooperate to create a more rigid base for legs 20. The coupling 24 also includes other apertures. Apertures 50, 54 extend through a side wall of the coupling 24 and into the axial cavities 42, 44 respectively. It should be appreciated that while only one coupling 24 is described, identical couplings are incorporated on both sides of the cross bar 22 to selectively connect to the cross bar 22 and the pair of leg members 20. As presently preferred, the coupling 24 is an injection molded polycarbonate part. However, other materials and methods of fabrication may provide a suitable coupling.

Leg member 20 is secured to coupling 24 by a locking mechanism 58. The leg member 20 has an aperture 60 therethrough. The aperture 60 is aligned with the apertures 50, 54 in the coupling 24. The locking mechanism 58 includes a quick release mechanism having a detent button 62 biased by a spring element 64. The locking mechanism 58 is received within the tubular structure of leg 20. The detent button 62 extends through the aperture 60 in the leg member 20 and through the aperture 50 in the coupling 24 to releasably and independently secure the leg member 20 in axial cavity 42. A force is applied to the detent button 62 to disconnect the leg member 20 from the coupling 24. The force displaces the detent button 62 into the axial cavity 42 to disengage the detent button 62 from within the aperture 50 in the coupling 24, thereby enabling the leg member 20 to be removed from axial cavity 42. It should be appreciated that another leg member 20 is secured in the other axial cavity 44 (including extension of the first aperture 54) of the coupling 24 and the other pair of apertures 46 of the cross bar 22 in the same manner as that just described. It should also be appreciated that quick release mechanism described above is only one embodiment, and alternative locking mechanisms are suitable and intended to be within the scope of the present disclosure.

It will further be appreciated that each leg member 20 includes an independent locking mechanism for securing to the coupling 24, while the cross bar 22 interlocks with the leg members 20 for securement to the coupling 24. Cross bar 22 is first inserted within the transverse cavity 40. After cross bar 22 is positioned in the transverse cavity 40, both of the leg members 20 are inserted in axial cavities 42, 44 and into apertures 46, preventing cross bar 22 from extraction from the transverse cavity 40. The leg members 20 are adjusted such that the detent button 62 extends through both the aperture 60 and the apertures 50, 54 in the coupling 24, preventing the leg members 20 from extraction from the apertures 46 and the axial cavities 42, 44.

While leg members 20 and cross bar 22 are illustrated and described as being received and secured in axial cavities 42, 44 and transverse cavity 40, respectively, other embodiments may include leg members 20 and cross bar 22 that are fixedly attached (for example, by welding) to couplings 24. Leg members 20 and cross bar 22 are illustrated and described as being received and secured in axial cavities 42, 44 and transverse cavity 40, respectively, because they provide the additional advantage of ease of collapsibility and ease of transport of the display device 10.

Now referring to FIGS. 3-8, the display device 10 further includes at least one wheel 68 mounted to at least one coupling 24. The coupling 24 includes a pair of mounting tabs 70 extending from a body 72 of the coupling 24. The mounting tabs 70 may include a triangular support 74 that prevents each tab 70 from flexing. Each tab 70 also includes an aperture 76 that receives an axle 78 for mounting the wheel 68. The axle 78 is a cylindrical bar that is received within a cylindrical aperture (not shown) in the wheel and in the aperture 76 in each tab 70 to connect the wheel 68 to the display device 10. While the axle 78 is described and illustrated as a cylindrical bar, in other embodiments, the axle may be a tubular structure.

The wheel 68 is mounted on the axle 78 such that the wheel 68 may freely rotate around the axle 78. A diameter of the axle 78 increases on each end 80 after passing through the apertures 76 in the tabs 70 to secure the axle 78 within the tabs 70. A clip 82 may be positioned between the end 80 and the tab 70 to prevent the end 80 from backing through the aperture 76.

Figure 5:
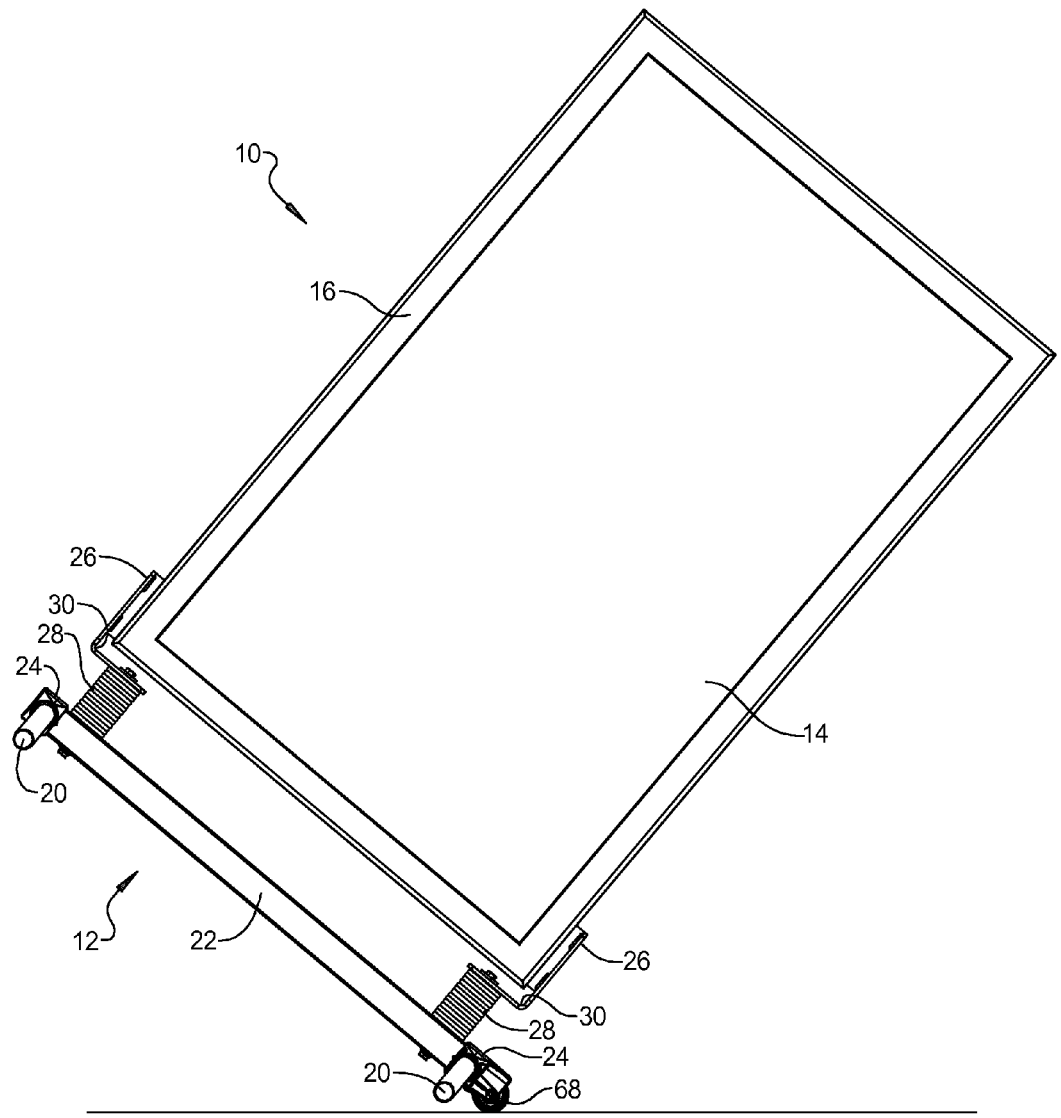
FIG. 5 is a side view of the display device of FIG. 3 in the assembled, rolling position.
Figure 6:
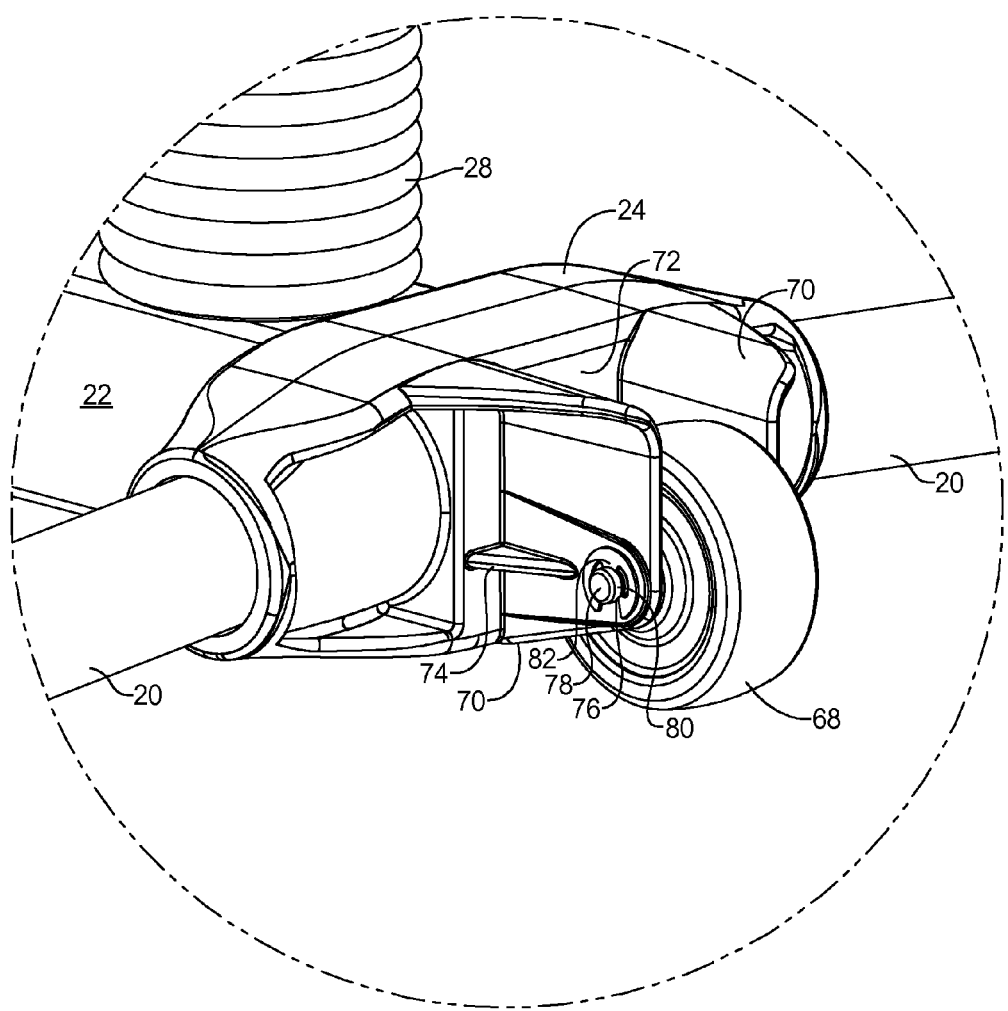
FIG. 6 is a perspective, detail view of the wheel and wheel coupling shown in FIG. 3.
Figure 7:
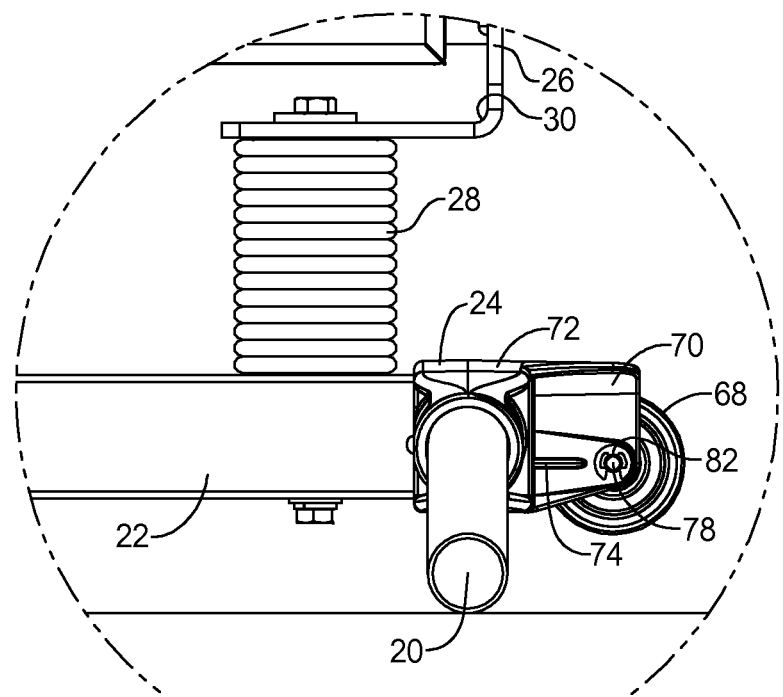
FIG. 7 is a side, detail view of the wheel and wheel coupling shown in FIG. 4.
Figure 8:
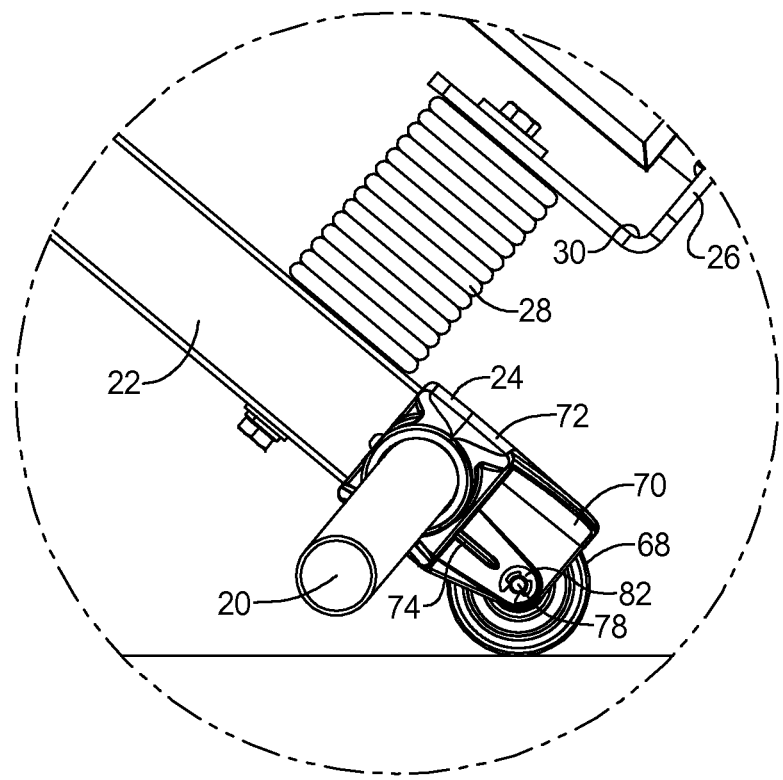
FIG. 8 is a side, detail view of the wheel and wheel coupling shown in FIG. 5.
Figure 9:
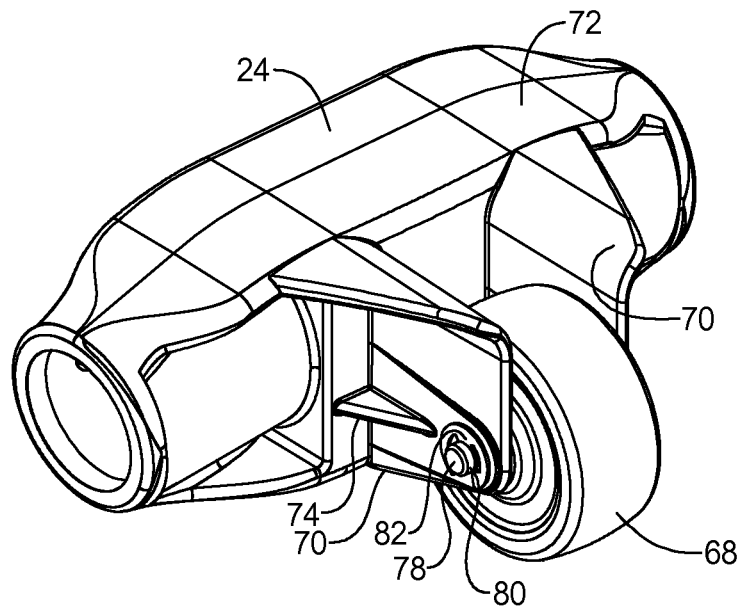
FIG. 9 is a perspective view of the wheel coupling shown in FIG. 3.

Referring specifically to FIGS. 5 and 8, the display device 10 may be tilted at an angle for movement. When in the stationary position (FIGS. 3-4 and 6-7), the wheel 68 on the display device 10 does not make contact with the ground surface. The display device 10 is supported by the legs 20. However, the display device 10 may be tilted at an angle with the ground surface such that the wheel 68 makes contact with the ground surface, and the legs 20 lose contact with the ground surface, allowing the display device 10 to be rolled. The angle that the display device 10 must be tilted may be determined based on height of the user, center of gravity of the display device, and/or clearance between the display device 10 and other structures (for example only, doorways, ceilings, power lines, trees, etc.). The height of the user directly influences the height that is comfortable for the user to transport the display device 10. A predetermined angle for transport of the display device 10 may be determined by angling the display device 10 to an acceptable angle for a given percent height range (for example only, a 75% height). Balancing the display device 10 at the center of gravity of the display device 10 may assist the user in transporting the display device 10 by putting a majority of the weight of the display device 10 on the wheel 68 instead of in the user's hands.

The angle that the display device 10 must be tilted further depends on the length of the legs 20. The angle increases as the length of the legs 20 increase. The angle also increases as the angle of the legs 20 with respect to the horizontal increases. The angle of the wheel 68 may be altered to increase or decrease the angle that the display device 10 must be tilted.

Figure 10:
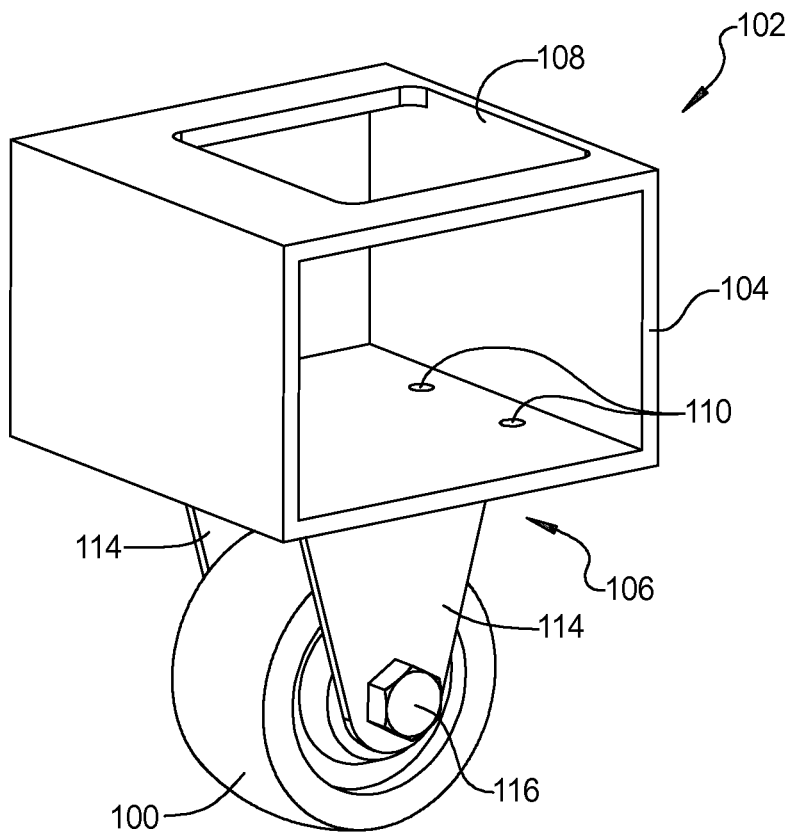
FIG. 10 is a perspective view of another embodiment of a wheel and wheel coupling in accordance with the present disclosure.
Figure 11:
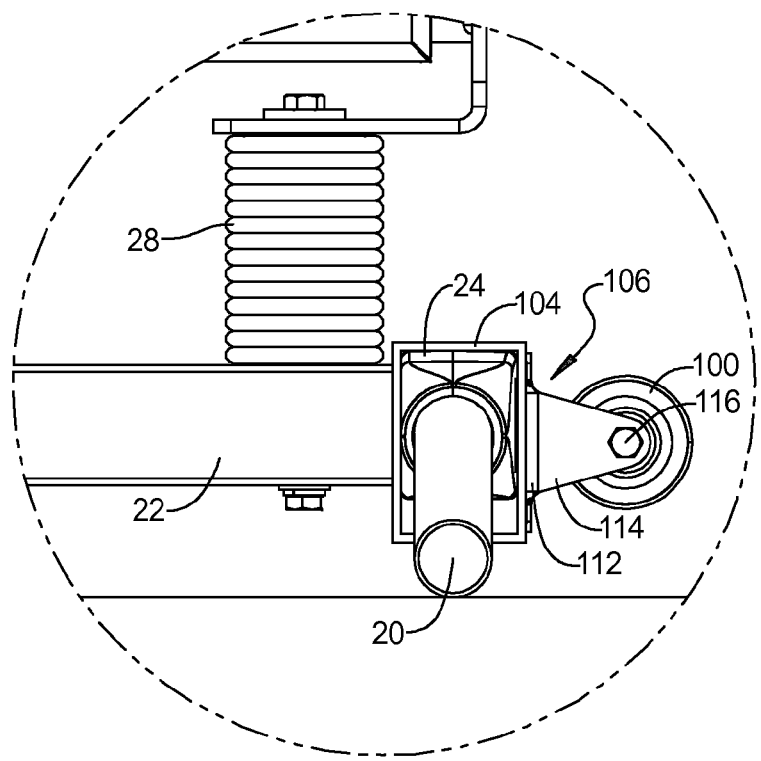
FIG. 11 is a side, detail view of the wheel and wheel coupling of FIG. 10 in a stationary position.
Figure 12:
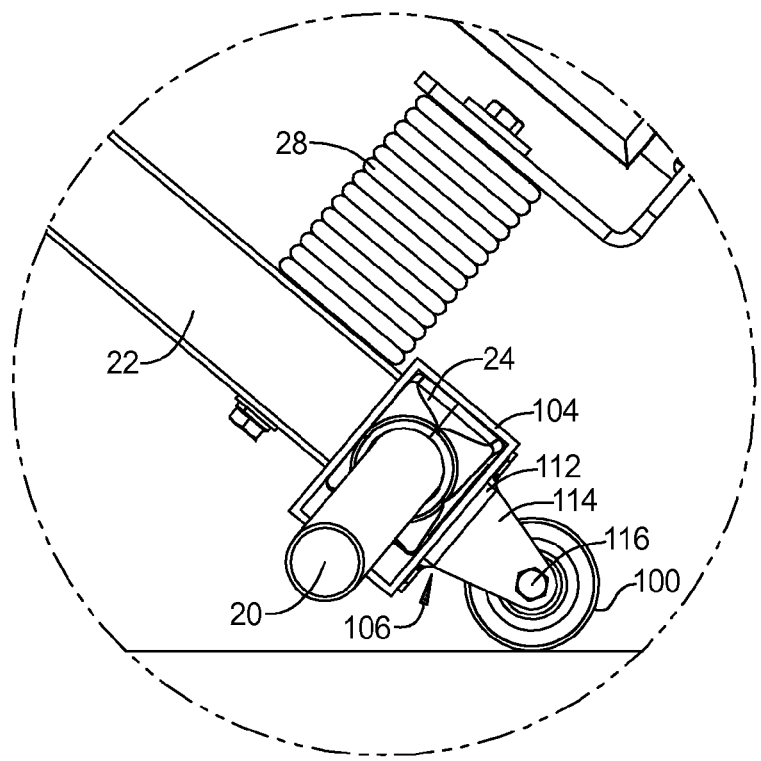
FIG. 12 is a side, detail view of the wheel and wheel coupling of FIG. 10 in a rolling position.

Now referring to FIGS. 10-12, another embodiment of a wheel 100 and wheel coupling 102 are shown. The wheel coupling may include a sleeve 104 and a connector 106. The sleeve 104 may be a rectangular tube having a square aperture 108, or any shape that corresponds to the cross bar 22, in one side of the tube 104. The square aperture 108 may be in the side opposite the side having the connector 106. The side having the connector 106 may include a plurality of apertures 110 (for example only, four apertures) for engaging the sleeve 104 with the connector 106. The connector 106 and sleeve 104 may be an injection molded polycarbonate part or, in other embodiments, may be formed of a metal or metal alloy.

The connector 106 may include a back 112 and two tabs 114. The back 112 may have a plurality of apertures (not shown) that align with the four apertures 110 on the sleeve 104 to engage the sleeve 104 with the connector 106. A plurality of fasteners (not shown) may secure the sleeve 104 with the connector 106 through the apertures 110. The fasteners may be any fastener known in the art, for example only, a nut and bolt, a screw, etc. For example only, the fasteners may be the same as, or similar to, the fasteners 226 illustrated in FIG. 13. In an alternative embodiment, the connector 106 may be secured to the sleeve 104 by an adhesive or weld.

The tabs 114 may be triangular shaped with an aperture (not shown) in the point for receiving an axle 116. The axle 116 is a cylindrical bar that passes through a cylindrical aperture (not shown) in the wheel 100 and through the aperture in each tab 114 to connect the wheel 100 to the display device 10. In other embodiments, the axle may have a tubular structure.

The wheel 100 is mounted on the axle 116 such that the wheel 100 may freely rotate around the axle 116. A diameter of the axle 116 increases on each end after passing through the apertures in the tabs 114 to secure the axle 116 within the tabs 114. For example only (as shown in FIGS. 10-12), the axle 116 may be a bolt 116 that is secured between the tabs 114 by a nut (not shown). In other embodiments, the axle 116 may be a cylindrical bar that is clipped or pinned on at least one side to secure the axle 116 between the tabs 114.

The sleeve 104 and connector 106 may mount to the display device 10 by sliding the coupling 24 within the sleeve 104 and aligning the square aperture 108 with the transverse cavity 40 in the coupling 24. The square aperture 108 may have dimensions the same or slightly larger than the dimensions of the transverse cavity 40. Once the cross bar 22 is inserted into the transverse cavity 40, through the square aperture 108, the sleeve 104 and connector 106 are secured on the coupling 24. To remove the sleeve 104 and connector 106, the cross bar 22 is removed from the transverse cavity 40 and the square aperture 108, and the coupling 24 is removed from the interior of the sleeve 104.

Referring specifically to FIG. 12, the display device 10 may be tilted at an angle for movement. When in the stationary position (FIG. 11), the wheel 100 on the display device 10 does not make contact with the ground surface. The display device 10 is supported by the legs 20. However, the display device 10 may be tilted at an angle with the ground surface such that the wheel 100 makes contact with the ground surface, and the legs 20 lose contact with the ground surface, allowing the display device 10 to be rolled. The angle that the display device 10 must be tilted may be determined based on height of the user, center of gravity of the display device, and/or clearance between the display device 10 and other structures (for example only, doorways, ceilings, power lines, trees, etc.). The height of the user directly influences the height that is comfortable for the user to transport the display device 10. A predetermined angle for transport of the display device 10 may be determined by angling the display device 10 to an acceptable angle for a given percent height range (for example only, a 75% height). Balancing the display device 10 at the center of gravity of the display device 10 may assist the user in transporting the display device 10 by putting a majority of the weight of the display device 10 on the wheel 100 instead of in the user's hands.

The angle that the display device 10 must be tilted further depends on the length of the legs 20. The angle increases as the length of the legs 20 increase. The angle also increases as the angle of the legs 20 with respect to the horizontal increases. The angle of the wheel 100 may be altered to increase or decrease the angle that the display device 10 must be tilted.

Figure 13:
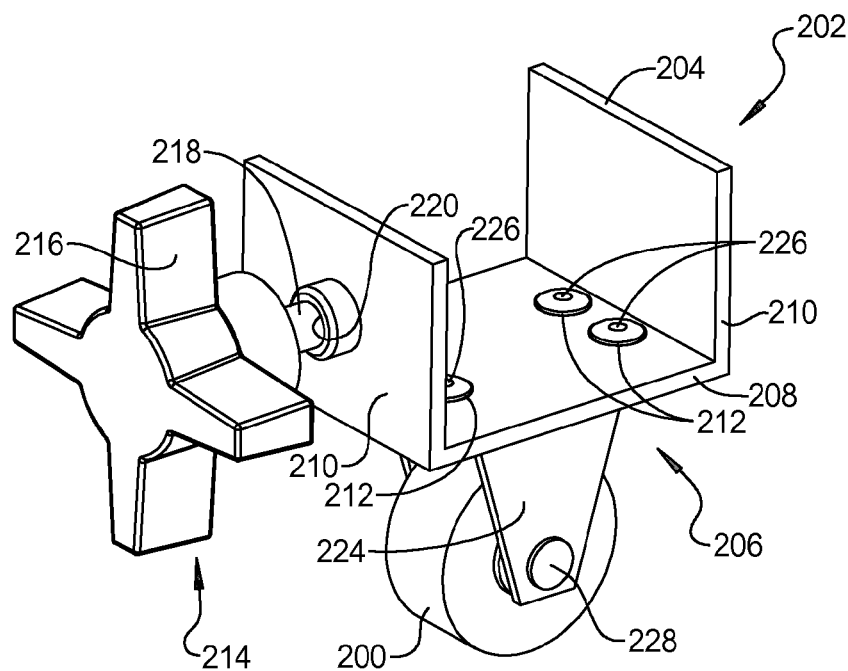
FIG. 13 is a perspective view of another embodiment of a wheel and wheel coupling in accordance with the present disclosure.
Figure 14:
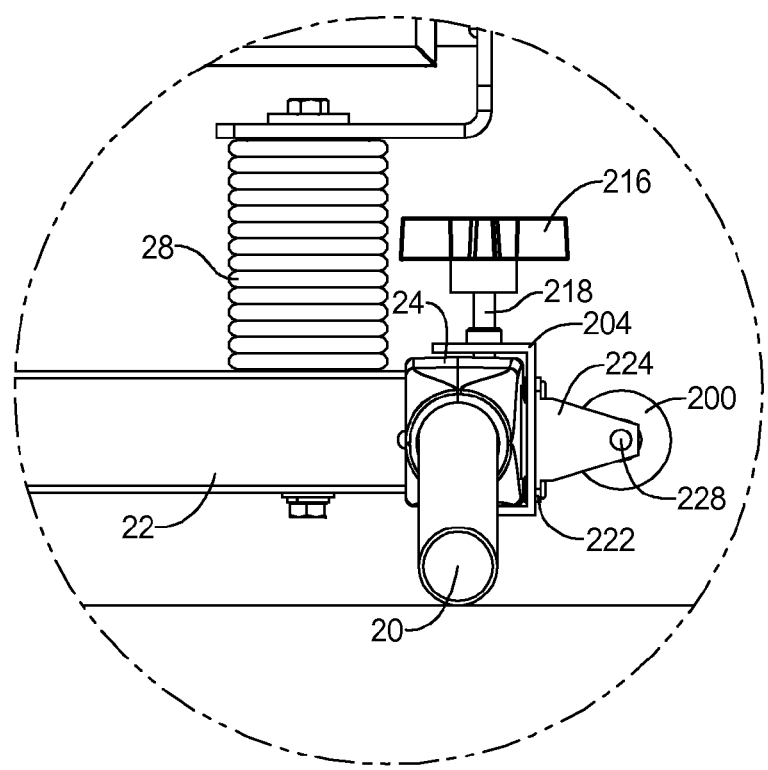
FIG. 14 is a side, detail view of the wheel and wheel coupling of FIG. 13 in a stationary position.
Figure 15:
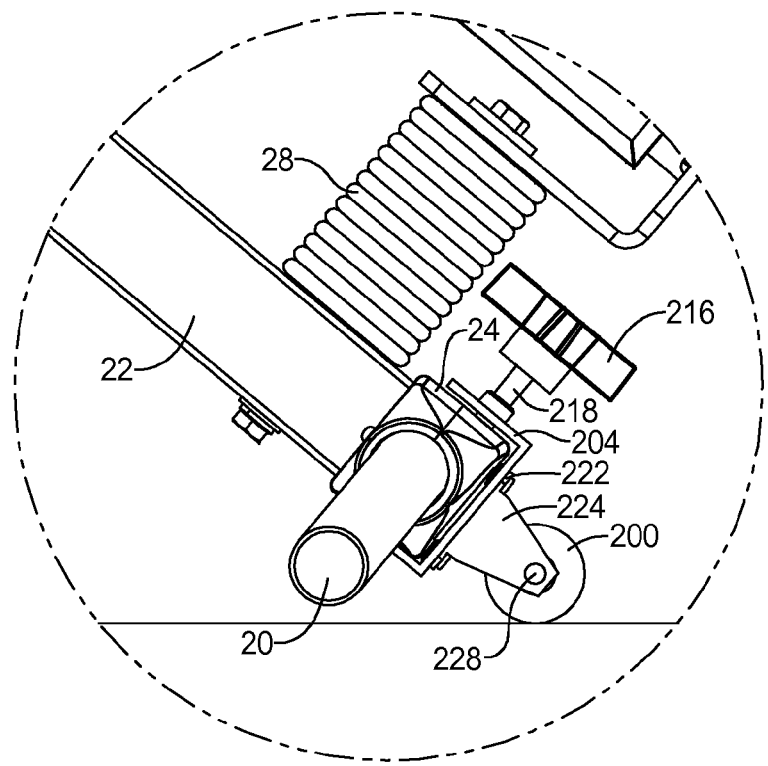
FIG. 15 is a side, detail view of the wheel and wheel coupling of FIG. 13 in a rolling position.

Now referring to FIGS. 13-15, another embodiment of a wheel 200 and wheel coupling 202 are shown. The wheel coupling 202 may include a U-shaped body 204 and a connector 206. The body 204 may include a base 208 and two sides 210. The base 208 may include a plurality of apertures 212 (for example only, four apertures) for engaging the body 204 with the connector 206. The body 204 and connector 206 may be an injection molded polycarbonate part or, in other embodiments, may be formed of a metal or metal alloy.

The base 208 may form a clamp and further includes a tightening mechanism 214 to secure the body 204 onto the coupling 24. The tightening mechanism 214 may include a knob 216 and a threaded bar, shaft, or stem 218 that is received within a threaded aperture 220 in the side 210 of the body 204. The knob 216 screws the threaded bar 218 into the aperture 220 to tighten the body 204 onto the coupling 24.

The connector 206 may include a back 222 and two tabs 224. The back 222 may have a plurality of apertures (not shown) that align with the four apertures 212 on the base 208 to engage the body 204 with the connector 206. A plurality of fasteners 226 (for example only, four fasteners) may secure the body 204 with the connector 206 through the apertures 212. The fasteners 226 may be any fastener known in the art, for example only, a nut and bolt, a screw, etc. In an alternative embodiment, the connector 206 may be secured to the body 204 by an adhesive or weld.

The tabs 224 may be triangular shaped with an aperture (not shown) in the point for receiving an axle 228. The axle 228 is a cylindrical bar that passes through a cylindrical aperture (not shown) in the wheel and through the aperture in each tab 224 to connect the wheel 200 to the display device 10. In other embodiments, the axle may have a tubular structure.

The wheel 200 is mounted on the axle 228 such that the wheel 200 may freely rotate around the axle 228. A diameter of the axle 228 increases on each end after passing through the apertures in the tabs 224 to secure the axle 228 within the tabs 224. For example only, the axle 228 may be a bolt that is secured between the tabs 224 by a nut. In other embodiments, the axle 228 may be a cylindrical bar or tube that is clipped or pinned on at least one side to secure the axle 228 between the tabs 224.

The body 204 and connector 206 may mount to the display device 10 by sliding the u-shaped body 204 over the coupling 24, wherein the coupling 24 fits within the base 208 and sides 210 of the body 204. The knob 216 is then turned such that the threaded bar 218 is screwed into the aperture 220 on the body 204 and the threaded bar 218 presses against the side of the coupling 24 and secures the body 204 onto the coupling 24. The body 204 may be removed from the display device 10 by turning the knob 216 the opposite direction to loosen the threaded bar 218 from the body 204. The u-shaped body 204 can then be removed from the coupling 24.

Referring specifically to FIG. 15, the display device 10 may be tilted at an angle for movement. When in the stationary position (FIG. 14), the wheel 200 on the display device 10 does not make contact with the ground surface. The display device 10 is supported by the legs 20. However, the display device 10 may be tilted at an angle with the ground surface such that the wheel 200 makes contact with the ground surface, and the legs 20 lose contact with the ground surface, allowing the display device 10 to be rolled. The angle that the display device 10 must be tilted may be determined based on height of the user, center of gravity of the display device, and/or clearance between the display device 10 and other structures (for example only, doorways, ceilings, power lines, trees, etc.). The height of the user directly influences the height that is comfortable for the user to transport the display device 10. A predetermined angle for transport of the display device 10 may be determined by angling the display device 10 to an acceptable angle for a given percent height range (for example only, a 75% height). Balancing the display device 10 at the center of gravity of the display device 10 may assist the user in transporting the display device 10 by putting a majority of the weight of the display device 10 on the wheel 200 instead of in the user's hands.

The angle that the display device 10 must be tilted further depends on the length of the legs 20. The angle increases as the length of the legs 20 increase. The angle also increases as the angle of the legs 20 with respect to the horizontal increases. The angle of the wheel 200 may be altered to increase or decrease the angle that the display device 10 must be tilted.

Figure 16:
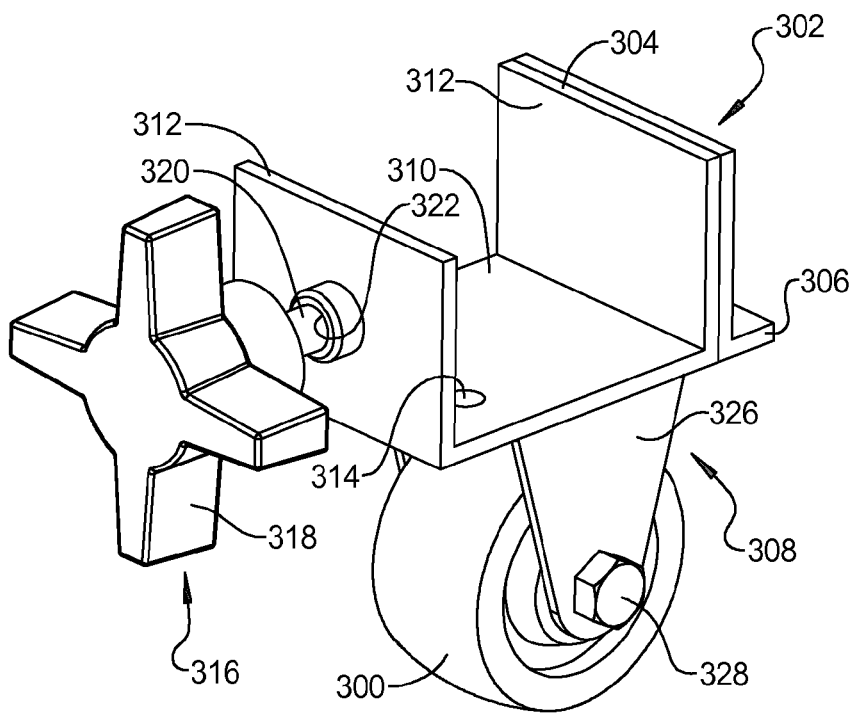
FIG. 16 is a perspective view of another embodiment of a wheel and wheel coupling in accordance with the present disclosure.
Figure 17:
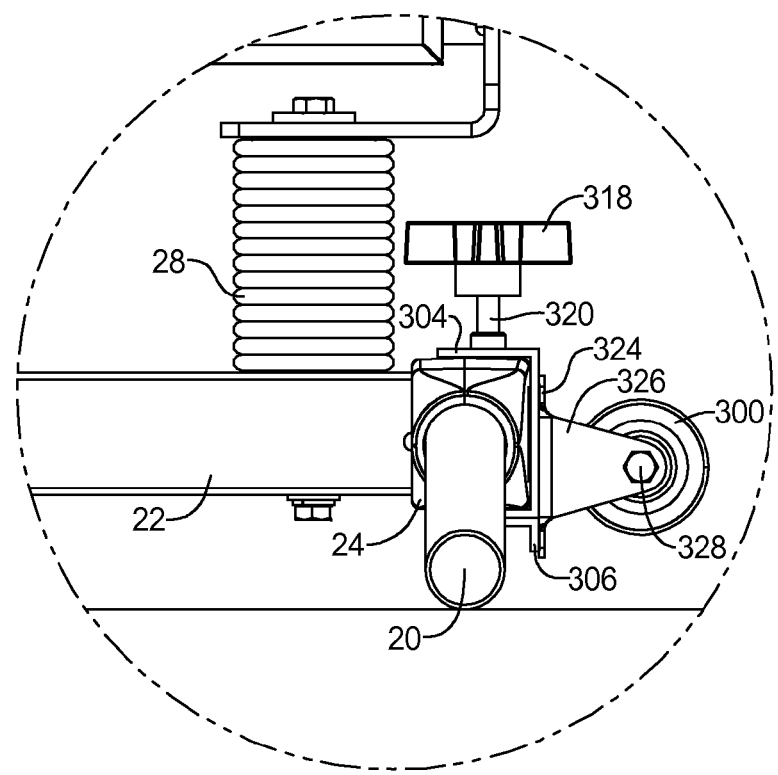
FIG. 17 is a side, detail view of the wheel and wheel coupling of FIG. 16 in a stationary position.
Figure 18:
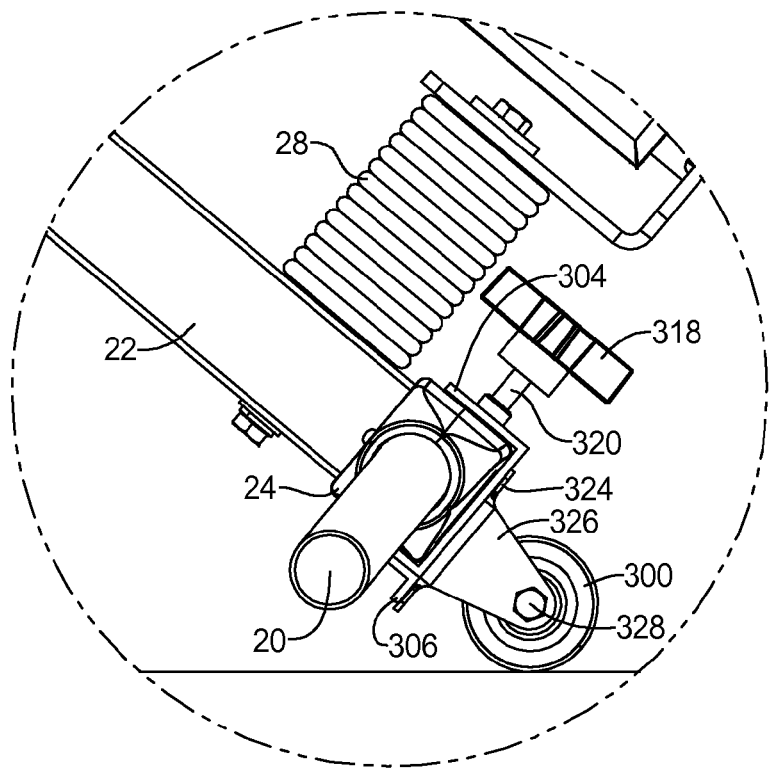
FIG. 18 is a side, detail view of the wheel and wheel coupling of FIG. 16 in a rolling position.

Now referring to FIGS. 16-18, another embodiment of a wheel 300 and wheel coupling 302 are shown. The wheel coupling 302 may include a U-shaped body 304, an extension 306, and a connector 308. The body 304 may include a base 310 and two sides 312. The base 310 may include a plurality of apertures 314 (for example only, four apertures) for engaging the body 304 with the connector 308. The body 304, extension 306, and connector 308 may be an injection molded polycarbonate part or, in other embodiments, may be formed of a metal or metal alloy.

The extension 306 may be connected to the base 310 on a side 312 closest to the ground surface either by fasteners, an adhesive, or a weld, and the extension 306 may include a pair of the apertures 314 for engaging the body 304 with the connector 308. The extension 306 may add increased strength to the base 310 and allow for a larger wheel 300 to be used with the wheel coupling. The added strength and wheel size may be necessary for larger or heavier display devices 10.

The base 310 may form a clamp and further includes a tightening mechanism 316 to secure the body 304 onto the coupling 24. The tightening mechanism 316 may include a knob 318 and a threaded bar, shaft, or stem 320 that is received within a threaded aperture 322 in the side 312 of the body 304. The knob 318 screws the threaded bar 320 into the aperture 322 to tighten the body 304 onto the coupling 24.

The connector 308 may include a back 324 and two tabs 326. The back 324 may have a plurality of apertures (not shown) that align with the two apertures 314 on the base 310 and two apertures 314 on the extension 306 to engage the body 304 and extension 306 with the connector 308. A plurality of fasteners (not shown) may secure the body 304 with the connector 308 through the apertures 314. The fasteners may be any fastener known in the art, for example only, a nut and bolt, a screw, etc. For example only, the fasteners may be the same as, or similar to, the fasteners 226 illustrated in FIG. 13. In an alternative embodiment, the connector 308 may be secured to the body 304 and extension 306 by an adhesive or weld.

The tabs 326 may be triangular shaped with an aperture (not shown) in the point for receiving an axle 328. The axle 328 is a cylindrical bar that is received within a cylindrical aperture (not shown) in the wheel and through the aperture (not shown) in each tab 326 to connect the wheel 300 to the display device 10. In other embodiments, the axle 328 may have a tubular structure.

The wheel 300 is mounted on the axle 328 such that the wheel 300 may freely rotate around the axle 328. A diameter of the axle 328 increases on each end after passing through the apertures in the tabs 326 to secure the axle 328 within the tabs 326. For example only, the axle 328 may be a bolt that is secured between the tabs 326 by a nut. In other embodiments, the axle 328 may be a cylindrical bar or tube that is clipped or pinned on at least one side to secure the axle 328 between the tabs 326.

The body 304, extension 306, and connector 308 may mount to the display device 10 by sliding the u-shaped body 304 over the coupling 24, wherein the coupling 24 fits within the base 310 and sides 312 of the body 304. The knob 318 is then turned such that the threaded bar 320 is screwed into the aperture 322 on the body 304 and the threaded bar 320 presses against the side of the coupling 24 and secures the body 304 onto the coupling 24. The body 304 may be removed from the display device 10 by turning the knob 318 the opposite direction to loosen the threaded bar 320 from the body 304. The u-shaped body 304 can then be removed from the coupling 24.

Referring specifically to FIG. 18, the display device 10 may be tilted at an angle for movement. When in the stationary position (FIG. 17), the wheel 300 on the display device 10 does not make contact with the ground surface. The display device 10 is supported by the legs 20. However, the display device 10 may be tilted at an angle with the ground surface such that the wheel 300 makes contact with the ground surface, and the legs 20 lose contact with the ground surface, allowing the display device 10 to be rolled. The angle that the display device 10 must be tilted may be determined based on height of the user, center of gravity of the display device, and/or clearance between the display device 10 and other structures (for example only, doorways, ceilings, power lines, trees, etc.). The height of the user directly influences the height that is comfortable for the user to transport the display device 10. A predetermined angle for transport of the display device 10 may be determined by angling the display device 10 to an acceptable angle for a given percent height range (for example only, a 75% height). Balancing the display device 10 at the center of gravity of the display device 10 may assist the user in transporting the display device 10 by putting a majority of the weight of the display device 10 on the wheel 300 instead of in the user's hands.

The angle that the display device 10 must be tilted further depends on the length of the legs 20. The angle increases as the length of the legs 20 increase. The angle also increases as the angle of the legs 20 with respect to the horizontal increases. The angle of the wheel 300 may be altered to increase or decrease the angle that the display device 10 must be tilted.

Figure 19:
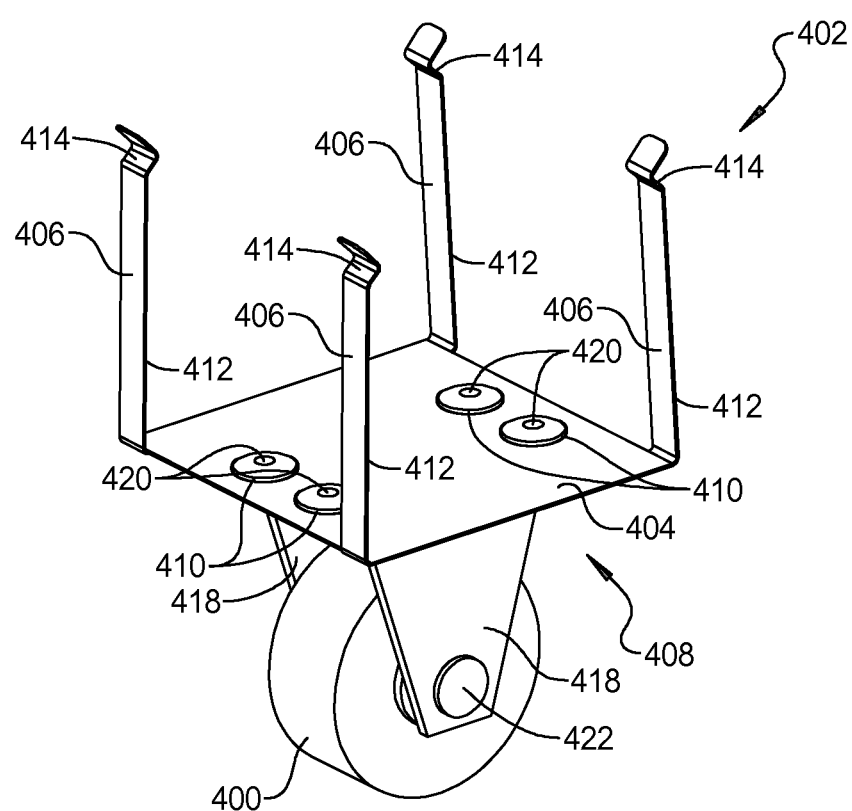
FIG. 19 is a perspective view of another embodiment of a wheel and wheel coupling in accordance with the present disclosure.
Figure 20:
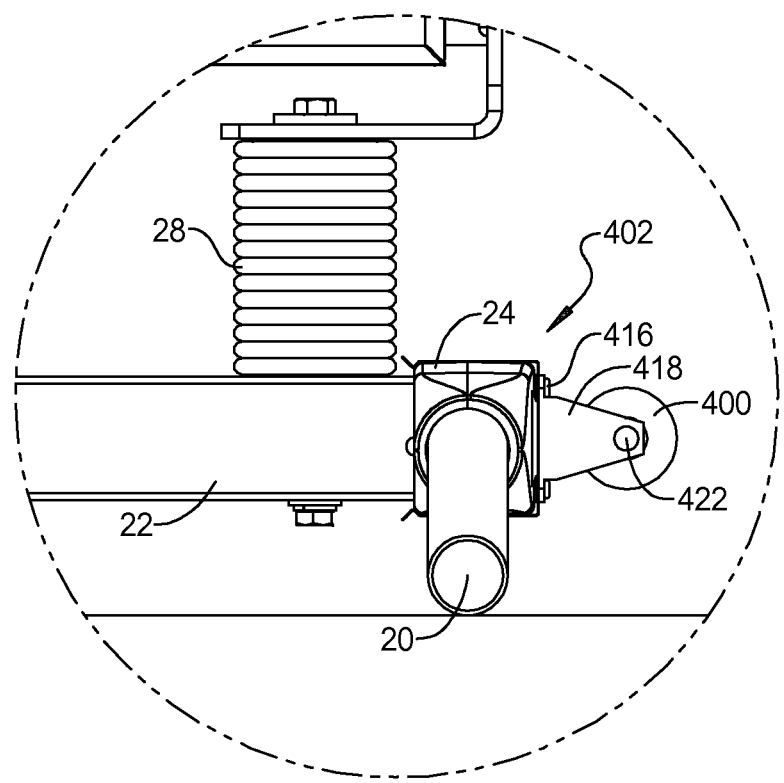
FIG. 20 is a side, detail view of the wheel and wheel coupling of FIG. 19 in a stationary position.
Figure 21:
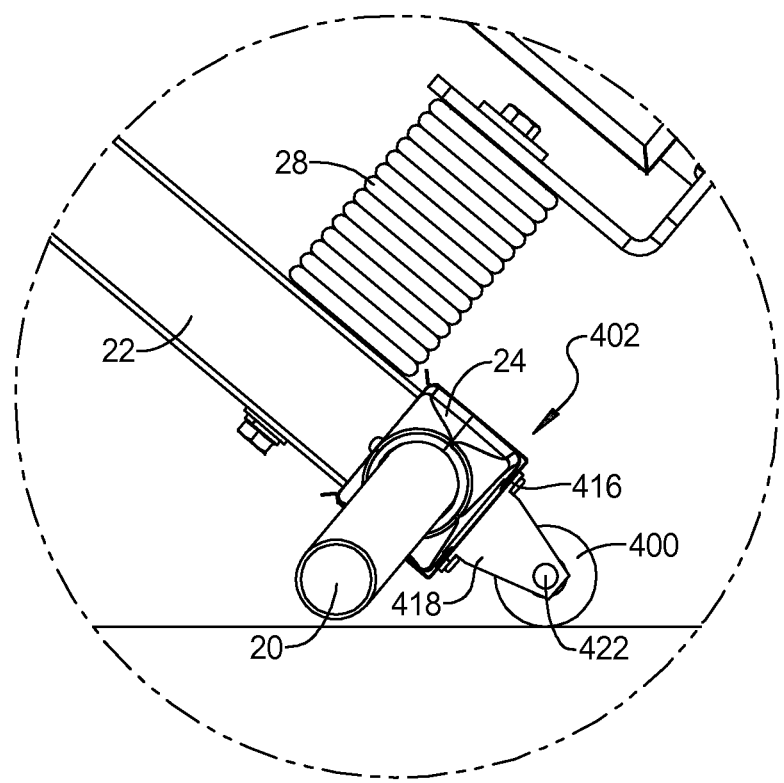
FIG. 21 is a side, detail view of the wheel and wheel coupling of FIG. 19 in a rolling position.

Now referring to FIGS. 19-21, another embodiment of a wheel 400 and wheel coupling 402 are shown. The wheel coupling 402 may include a rectangular or square body 404, a plurality of clips or fingers 406, and a connector 408. The body 404 may include a plurality of apertures 410 (for example only, four apertures) for engaging the body 404 with the connector 408. The body 404, clips 406, and connector 408 may be an injection molded polycarbonate part or, in other embodiments, may be formed of a metal or metal alloy.

The clips 406 may each include a straight portion 412 and an indented portion 414. The clips 406 are relatively stiff, such that when flexed or deformed, the clips 406 return to the original position. When mounted on the coupling 24, the straight portion 412 engages the coupling 24 and the indented portion 414 retains the wheel coupling 402 on the coupling 24. The straight portions 412 compress the coupling 24 to hold the wheel coupling 402 in a predetermined place on the coupling 24, and the distance between indented portions 414 are less than the length of the coupling, such that the coupling cannot back out of the clips 406.

The connector 408 may include a back 416 and two tabs 418. The back 416 may have a plurality of apertures (not shown) that align with the four apertures 410 on the body 404 to engage the body 404 with the connector 408. A plurality of fasteners 420 (for example only, four fasteners) may secure the body 404 with the connector 408 through the apertures 410. The fasteners 420 may be any fastener known in the art, for example only, a nut and bolt, a screw, etc. In an alternative embodiment, the connector 408 may be secured to the body 404 by an adhesive or weld.

The tabs 418 may be of a generally triangle shape with an aperture (not shown) in the point for receiving an axle 422. The axle 422 is a cylindrical bar that passes through a cylindrical aperture (not shown) in the wheel 400 and through the aperture in each tab 418 to connect the wheel 400 to the display device 10. In other embodiments, the axle 422 may have a tubular structure.

The wheel 400 is mounted on the axle 422 such that the wheel 400 may freely rotate around the axle 422. A diameter of the axle 422 increases on each end after passing through the apertures in the tabs 418 to secure the axle 422 within the tabs 418. For example only, the axle 422 may be a bolt that is secured between the tabs 418 by a nut. In other embodiments, the axle 422 may be a cylindrical bar or tube that is clipped or pinned on at least one side to secure the axle 422 between the tabs 418.

The body 404 and connector 408 may mount to the display device 10 by sliding the plurality of clips 406 over the coupling 24, wherein the coupling 24 fits within the body 404 and clips 406. The body 404 may be removed from the display device 10 by releasing the clips 406 from the coupling 24. The clips 406 may be released by spreading the indented portions 414 in opposite directions, away from each other, until the indented portions are beyond the structure of the coupling 24. The clips 406 may then slide over the sides of the coupling 24 to release the coupling 24 from the wheel coupling 402.

Referring specifically to FIG. 21, the display device 10 may be tilted at an angle for movement. When in the stationary position (FIG. 20), the wheel 400 on the display device 10 does not make contact with the ground surface. The display device 10 is supported by the legs 20. However, the display device 10 may be tilted at an angle with the ground surface such that the wheel 400 makes contact with the ground surface, and the legs 20 lose contact with the ground surface, allowing the display device 10 to be rolled. The angle that the display device 10 must be tilted may be determined based on height of the user, center of gravity of the display device, and/or clearance between the display device 10 and other structures (for example only, doorways, ceilings, power lines, trees, etc.). The height of the user directly influences the height that is comfortable for the user to transport the display device 10. A predetermined angle for transport of the display device 10 may be determined by angling the display device 10 to an acceptable angle for a given percent height range (for example only, a 75% height). Balancing the display device 10 at the center of gravity of the display device 10 may assist the user in transporting the display device 10 by putting a majority of the weight of the display device 10 on the wheel 400 instead of in the user's hands.

The angle that the display device 10 must be tilted further depends on the length of the legs 20. The angle increases as the length of the legs 20 increase. The angle also increases as the angle of the legs 20 with respect to the horizontal increases. The angle of the wheel 400 may be altered to increase or decrease the angle that the display device 10 must be tilted.

The wheel couplings 102, 202, 302, and 402 may be utilized as temporary wheel couplings or may be used to retrofit couplings that are currently in production. Wheel couplings 102, 202, 302, and 402 are advantageous because they may be mated to couplings that are currently in production or currently used in industry to allow once stable or non-moveable display devices to be easily rolled to other locations. Further, fewer wheel couplings 102, 202, 302, and 402 are necessary for consumers to keep in stock because each wheel coupling 102, 202, 302, and 402 may be used on multiple display devices and couplings.

It is understood that the wheel 68, 100, 200, 300, 400 in each embodiment may be any wheel known in the art.

The present disclosure has been described with reference to particular embodiments. However, one skilled in the art will recognize that certain modifications may be made without departing from the present disclosure. For example, the size and shape of the coupling 24 may be modified for a given application. Likewise, the location and orientation of the detent apertures 50, 54 in the coupling 24 may be modified. Furthermore, the described embodiment illustrates a support structure in which all of the leg members 20 and the cross bar 22 are releasably secured to the coupling. One skilled in the art will understand that the support structure may employ fewer locking mechanisms. For example, each of the leg assemblies 18 may reflect a unitary element which is releasably secured to the cross bar 22. Similarly, the described embodiment illustrates a locking mechanism disposed within the cross bar 22 or leg members 20. However, the present disclosure could include a locking mechanism 58 or detent feature which is disposed within the cavities 40, 42, 44 formed in the coupling, and, thus, contemplated by the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A mobile support structure for a display device comprising:
    a cross bar having a first end and a second end;
    a display mounted on said cross bar;
    a first pair of legs for supporting said display;
    a first coupling defining a first transverse cavity and a first pair of axial cavities, said first transverse cavity receiving said first end of said cross bar and each of said first pair of axial cavities receiving an end of one of said first pair of legs;
    a second pair of legs for supporting said display;
    a second coupling defining a second transverse cavity and a second pair of axial cavities, said second transverse cavity receiving said second end of said cross bar and each of said second pair of axial cavities receiving an end of one of said second pair of legs; and
    a wheel coupling including a wheel and being engaged with at least one of said first coupling and said second coupling such that when in a stationary position, said wheel does not contact a ground surface and when in a tilted, moving position, said wheel contacts said ground surface for rolling said display from a first location to a second location.

2. The mobile support structure of claim 1, wherein said wheel coupling is integrally formed as part of said first coupling and further includes a pair of tabs extending radially from said first coupling for receiving an axle attaching said wheel to said wheel coupling.

3. The mobile support structure of claim 1, wherein said wheel coupling is a sleeve enveloping said first coupling, said sleeve including a pair of tabs extending radially from said wheel coupling for receiving an axle attaching said wheel to said wheel coupling.

4. The mobile support structure of claim 3, further comprising an aperture in said sleeve that aligns with said first transverse cavity and receives said first end of said cross bar.

5. The mobile support structure of claim 1, wherein said wheel coupling is a clamp having a U shape and partially surrounding said first coupling, said clamp including a pair of tabs extending radially from a back portion of said clamp for receiving an axle attaching said wheel to said wheel coupling.

6. The mobile support structure of claim 5, further comprising a knob and a threaded shaft, wherein a first end of said threaded shaft is received within an aperture in a top side of said clamp and said knob is fixed to a second end of said threaded shaft such that said knob rotates said shaft, moving said shaft in and out of said aperture.

7. The mobile support structure of claim 5, further comprising an extension increasing an area of said back portion.

8. The mobile support structure of claim 1, further including a plurality of clips engaged with said first coupling and attached to a base, said base including a pair of tabs extending radially from said base for receiving an axle attaching said wheel to said wheel coupling.

9. The mobile support structure of claim 1, further including a locking mechanism disposed in at least one of said cross bar and said first pair of legs.

10. A mobile support structure for a display device comprising:
    a cross bar extending between a plurality of couplings;
    a plurality of legs for supporting said cross bar and said plurality of couplings;
    a first coupling of said plurality of couplings engaged with a first end of said cross bar and an end of each of a first pair of said plurality of legs;
    a second coupling of said plurality of couplings engaged with a second end of said cross bar and an end of each of a second pair of said plurality of legs; and
    a wheel coupling including a wheel and being engaged with at least one of said first coupling and said second coupling,
    wherein when in a display position, said support structure is supported by said plurality of legs and when in a transport position, said wheel engages a ground surface, said plurality of legs no longer supports said support structure, and said wheel is configured to roll said display device from a first location to a second location.

11. The mobile support structure of claim 10, wherein said wheel coupling is integral with said at least one of said first coupling and said second coupling.

12. The mobile support structure of claim 11, further comprising:
    a plurality of tabs extending from a side of said at least one of said first coupling and second coupling, wherein each of said plurality of tabs defines an aperture; and
    an axle extending through said aperture in each of said plurality of tabs and supporting said wheel, wherein said axle is retained within said aperture in each of said plurality of tabs.

13. The mobile support structure of claim 10, wherein said wheel coupling is a separate component from said first coupling and said second coupling, and said wheel coupling is configured to engage with a plurality of different couplings.

14. The mobile support structure of claim 13, wherein said wheel coupling further includes a connector fixedly engaged to a body.

15. The mobile support structure of claim 14, wherein said body is a sleeve enveloping said at least of said first coupling and said second coupling, and said connector includes a pair of tabs extending radially from said wheel coupling, each of said pair of tabs defining an aperture for receiving an axle attaching said wheel to said connector.

16. The mobile support structure of claim 15, wherein said first coupling defines a first transverse cavity receiving said first end of said cross bar and said second coupling defines a second transverse cavity receiving said second end of said cross bar.

17. The mobile support structure of claim 16, further comprising an aperture in said body that aligns with said transverse cavity in said at least one of said first coupling and said second coupling and receives said first or second end of said cross bar.

18. The mobile support structure of claim 14, wherein said body is a clamp having a U shape and partially surrounding said at least one of said first coupling and said second coupling, said body including a pair of tabs extending radially from a back portion of said clamp for receiving an axle attaching said wheel to said wheel coupling.

19. The mobile support structure of claim 18, wherein said body includes a tightening mechanism received within an aperture on said body for securing said wheel coupling to said at least one of said first coupling and said second coupling, wherein said tightening mechanism rotates to drive a stem into said aperture to engage said at least one of said first coupling and said second coupling and out of said aperture to disengage said at least one of said first coupling and said second coupling.

20. The mobile support structure of claim 14, wherein said body includes a plurality of fingers engaged with said at least one of said first coupling and said second coupling to secure said wheel coupling to said at least one of said first coupling and said second coupling.

* * * * *